United States Patent Office 2,697,704
Patented Dec. 21, 1954

2,697,704

ADDUCTS OF 3-BETA,12-DIACYLOXY-5,7,9(11)-PREGNATRIEN-20-ONES

Robert H. Levin and George B. Spero, Kalamazoo Township, Kalamazoo County, and A Vern McIntosh, Jr., Kalamazoo, Mich., assignors to The Upjohn Company, Kalamazoo, Mich., a corporation of Michigan No Drawing. Application May 22, 1953,
Serial No. 356,892

5 Claims. (Cl. 260—239.55)

The present invention relates to adducts of 3-beta,12-diacyloxy-5,7,9(11)-pregnatrien-20-ones with certain acids, anhydrides, imides, and esters of alpha, beta-unsaturated dicarboxylic acids, particularly with maleic anhydride, maleimide, maleic acid and esters of maleic acids, and to processes for their production.

This application is a continuation-in-part of our copending application Serial No. 184,702, filed September 13, 1950, now U. S. Patent 2,623,043, issued December 23, 1952, and of our copending application Serial No. 228,131, filed May 24, 1951, now abandoned, to which references are made also for the preparation of the starting compounds referred to in this specification.

The adducts of 3-beta,12-diacyloxy-5,7,9(11)-pregnatrien-20-ones which are the preferred embodiment of this invention are represented by the following formula:

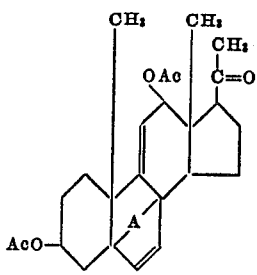

in which Ac is an acyl radical of an organic carboxylic acid, especially those hydrocarbon aliphatic carboxylic acids containing from 1 to 8 carbon atoms, inclusive, per molecule, and A is the adduct radical of an alpha, beta-unsaturated carbonyl compound of the group consisting of maleic acid, maleic anhydride, maleimide, and dialkyl maleates containing from 1 to 8 carbon atoms, inclusive, in each alkyl radical. The acyl radicals (Ac) may be the same or different.

The principal object of the present invention is to provide novel compounds which are useful in the preparation of steroid compounds containing an oxygen atom at carbon atom 11 in the steroid nucleus. Another object of the present invention is to provide a process for the production of these new compounds. Other objects and advantages of the invention, some of which are referred to hereinafter, will be apparent to those skilled in the art to which the invention pertains.

The compounds of the present invention are useful in the preparation of physiologically active steroid compounds which possess an oxygen atom in position 11 or 12. For example, heating a 3β,12-diacyloxy-5,7,9(11)-pregnatrien-20-ones with an amine as described by Levin et al. in U. S. Patent 2,577,776, issued December 11, 1951, removes the adduct group yielding a 3β,12-diacyloxy-5,7,9(11)-pregnatrien-20-one, which may be hydrogenated to give 3β,12-diacyloxypregnane-20-one. Hydrolysis of 3β,12-diacyloxypregnane-20-one with sodium hydroxide and oxidation with chromic acid results in the known pregnane-3,12,20-trione [Selye, Encyclopedia of Endocrinology, section I, volume IV, 1943, A. W. T. Franks Publishing Company, Montreal, p. 603; Hoehn and Mason, J. Am. Chem. Soc. 60, 1702 (1938); Reichstein et al., Helv. Chim. Acta 23, 747 (1940)] which has anesthetic and luteoid properties (Selye reference). When pregnane-3,12,20-trione is reacted with sodium borohydride, the 3-keto and 12-keto groups are reduced. Treatment of the thus-obtained 3α,12-dihydroxypregnane-20-one with acetic anhydride yields the 3α-acetate and oxidation of this compound with chromic acid produces 3α-acetoxypregnane-12,20-dione which was converted by Gallagher (U. S. Patent 2,447,325, columns 1 and 2) into 3α-hydroxypregnane-11,20-dione, which can be converted to cortisone by the method of Kritchevsky, Garmaise and Gallagher, J. Am. Chem. Soc. 74, 483 (1952).

Compounds of the present invention which are of particular interest are those compounds conforming to the foregoing general formula and in which AcO represents the radical resulting from the esterification of the hydroxyl group of the steroid with a carboxylic acid containing up to and including 8 carbon atoms. Such acids include formic, acetic, propionic, butyric, valeric, hexanoic, heptanoic, octanoic, succinic, glutaric, cyclopentanoic, cyclohexanoic, benzoic, toluic, and the like; the lower aliphatic acids of this group are preferred embodiments of the invention. The acids may contain substituents such as halogen, alkyl and methoxy radicals which are nonreactive with the reagents used in the methods described herein for the preparation of the compounds of the invention. The adduct bridge (—A—) that is represented between the 5 and 8 positions of the steroid nucleus of these compounds may be represented by the graphic formulae:

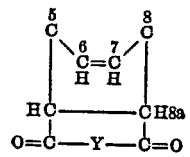

and

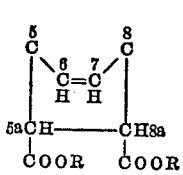

the first of which represents that derived from maleic anhydride and maleimide (in which Y is an oxygen (—O—) or an imino (—NH—) radical) while the second represents that derived from maleic acid and its esters. In this second formula R represents hydrogen or an alkyl radical. Such alkyl radicals (R) include the methyl, ethyl, propyl, isopropyl, butyl, isobutyl, lauryl, heptyl, octyl, cyclopentyl, cyclohexyl, benzyl, and similar radicals, which may contain substituents such as halogen, methoxy and hydroxyl radicals, which are nonreactive with the reagents used in the methods described herein for their preparation. While adducts of esters of maleic acids are described herein with particular reference to those of dimethyl maleate, the preferred embodiment of R in the foregoing second formula is a lower-alkyl radical containing from 1 to 8 carbon atoms, inclusive.

The compounds of the present invention are usually colorless crystalline solids. Those which are adducts formed from alpha, beta-unsaturated acids and anhydrides are readily convertible to diester adducts by esterification with reagents such as diazoalkanes in accordance with the method described by Wilds et al. in J. Org. Chem. 13, 763 (1948). The adducts of dicarboxylic acids may be converted to adducts of the corresponding dicarboxylic acid anhydrides by heat. The adducts of acid anhydrides may be converted to those of the corresponding acid by hydration with water.

The starting compounds from which the compounds of the present invention are prepared are adducts of 12-hydroxy or 12-bromo-3β-acyloxy-5,7,9(11)-pregnatrien-20-ones with maleic anhydride and its equivalents, having the general formula:

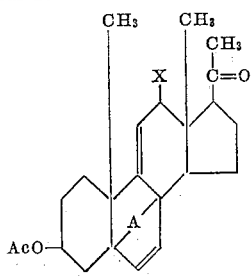

in which A and Ac have the significance hereinbefore specified and X is a bromine or hydroxyl radical. The preparation of these compounds, which is described in detail in our copending application Serial No. 184,702, filed September 13, 1950, now U. S. Patent 2,623,043, issued December 23, 1952, consists essentially of the following (alternative procedures are also described in our said copending application):

(1) Dehydroergosterol is converted to an adduct with maleic anhydride or the desired equivalent of maleic anhydride [H. Honigmann, Annalen 508, 89–98 (1934)].

(2) The adduct of dehydroergosterol is esterified by reaction, for example, with benzoyl chloride, acetyl chloride or formic acid.

(3) The resulting adduct of the 3β-acyloxydehydroergosterol is ozonized and then reduced in acid solution with zinc dust to obtain an adduct of a 3β-acyloxybisnor-5,7,9(11)-cholatrien-22-al. (See application of Robert H. Levin, Serial No. 111,100, filed August 18, 1949, now U. S. Patent 2,620,337 issued December 2, 1952, for details.)

(4) An enol ester of the resulting 3β-acyloxybisnor-5,7,9(11)-cholatrien-22-al adduct is prepared and ozonized to the adduct of a 3β-acyloxy-5,7,9(11)-pregnatrien-20-one.

(5) The resulting adduct of the 3β-acyloxy-5,7,9(11)-pregnatrien-20-one is reacted with N-bromosuccinimide or bromine to produce an adduct of a 3β-acyloxy-12-bromo-5,7,9(11)-pregnatrien-20-one.

(6) The adduct of the 3β-acyloxy-12-bromo-5,7,9(11)-prenatrien-20-one, on reaction with silver nitrate as described in Preparations 1 and 2 hereinafter, yields the adduct of a 3β-acyloxy-12-hydroxy-5,7,9(11)-pregnatrien-20-one, if the 12-hydroxy instead of the 12-bromo is desired as the starting compound. Other methods for the preparation of the 12-hydroxy compound are described in our copending application Serial No. 228,132 filed May 24, 1951, now abandoned.

In preparing the compounds of our invention from adducts of 12-bromo-3β-acyloxy-5,7,9(11)-pregnatrien-20-ones, either of two methods may be used. In the first (illustrated in Example 1 hereinafter), the 12-bromo group is replaced by a 12-acyloxy group by the use of a metal salt of the acid corresponding to the acyloxy group, for example, the acetoxy group may be introduced by the use of metal salts of acetic acid such as sodium acetate, silver acetate, and the like. Other salts, such as sodium benzoate and the like, may be used to introduce benzoxy and other acyloxy groups. Acetic acid and similar acids may be used as solvents in which to effect the reaction and normally the reaction is effected by heating at a temperature between approximately 100 and approximately 180 degrees centigrade, the period of heating to obtain optimum yields varying accordingly.

In the second method of converting an adduct of a 12-bromo-3β-acyloxy-5,7,9(11)-pregnatrien-20-one to the desired adduct of a 3β,12-diacyloxy-5,7,9(11)-pregnatrien-20-one (which is illustrated in Example 2 hereinafter), the 12-bromo compound is treated with zinc metal (dust) while in solution in the acid whose acyloxy group is to be substituted for the bromine of the steroid adduct. The reaction is generally conducted by dissolving the adduct of the 12-bromo steroid in the acid, for example, glacial acetic acid, and warmed; thereafter, to the warm solution, zinc dust is added portionwise and the mixture heated for a short period after the addition has been completed. The temperatures which can be used are generally lower than those required when the acylation is effected with a salt of the acid, as in the first method, and are preferably in the range between approximately 50 and approximately 100 degrees centigrade. Although zinc dust used in such reactions has heretofore acted solely as a reducing agent, effecting replacement of the bromo substituent by hydrogen, in this particular reaction the acyloxy radical replaces the bromine in the steroid adduct.

To convert an adduct of a 12-hydroxy-3β-acyloxy-5,7,9(11)-pregnatrien-20-one to the desired 3β,12-diacyloxy derivative, esterification may be effected with an acid anhydride or acyl halide, such as acetic anhydride and acetyl chloride. Acids themselves may be used for the esterification but in such event it is preferable to add an esterification catalyst such as sulfuric acid, paratoluenesulfonic acid and the like, to facilitate the reaction. When using acid anhydrides and halides and acids with esterification catalysts, the reaction mixtures are generally heated for several hours under gentle reflux but the temperatures of heating may be varied between approximately 100 and approximately 180 degrees centigrade. Pyridine may be used to facilitate the esterification by acid anhydrides and halides, in which event lower reaction temperatures, namely, room temperature and approximately 150 degrees centigrade, can be used. Such a process is illustrated in Example 3 hereinafter.

The acids and salts and acid derivatives (anhydrides and halides) which may be used in accordance with the foregoing procedures are those conforming to the definition of the acyl group (Ac) hereinbefore specified and include acetic, propionic, butyric, valeric, hexanoic, octanoic, benzoic, ortho-toluic, chloro, acetic and methoxybenzoic acids, their metal salts, their anhydrides and their chlorides and bromides.

These processes are particularly applicable to the preparation of maleic anhydride, maleimide and dialkyl maleate adducts. If maleic acid adducts are used as starting materials, they are either partially or entirely converted to maleic anhydride adducts; furthermore, attempts to hydrolyze maleic anhydride adducts directly with acids or bases to maleic acid adducts may result in partial or complete hydrolysis of the acyloxy radicals of the steroid nucleus.

Typical processes for producing typical compounds of this invention are described in the examples which follow. It is to be understood that there are merely illustrative and are not to be construed as limiting.

*Example 1.—Maleic anhydride adduct of 3β,12-diacetoxy-5,7,9(11)-pregnatrien-20-one*

One half (0.5) gram of the maleic anhydride adduct of 3β-acetoxy-12-bromo-5,7,9(11) - pregnatrien - 20 - one (melting point, 216–218 degrees centigrade; prepared as described in our copending application Serial No. 184,702, now U. S. Patent 2,623,043), 0.5 gram of sodium acetate (dried for 1 hour at 100 degrees centigrade), and 25 milliliters of acetic acid were mixed and heated at reflux temperature for 1 hour. The acetic acid was removed in vacuo and the residue taken up in methylene chloride and water. The methylene chloride layer was separated, washed with water and dried. Twenty-five (25) milliliters of isopropyl ether was then added and the solution concentrated until all of the methylene chloride was removed. Upon cooling, 0.27 gram of 3β,12-diacetoxy-5,7,9(11)-pregnatrien-20-one maleic anhydride adduct, melting point 232–245 degrees centigrade, crystallized; the crystals were filtered from the solution. Several recrystallizations from acetone-water raised the melting point to 248–250 degrees centigrade. $[\alpha]_D^{25} + 256$ degrees (chloroform).

*Analysis.*—Calculated for $C_{29}H_{34}O_6$: C, 68.21; H, 6.71. Found: C, 67.65; H, 6.55.

*Example 2.—Dimethyl maleate adduct of 3β,12-diacetoxy-5,7,9(11)-pregnatrien-20-one*

A solution of 2.7 grams of the dimethyl maleate adduct of 3β-acetoxy-12-bromo-5,7,9(11) - pregnatrien - 20 - one (melting point, 207.5–211 degrees centigrade; prepared as described in our copending application Serial No. 184,702, now U. S. Patent 2,623,043) in 100 milliliters of glacial acetic acid was warmed on the steam bath. Ten (10) grams of zinc dust was then added portionwise to the warm solution over a period of 10 minutes and the mixture was heated for an additional hour. The zinc dust was removed by filtration while the mixture was still hot and the filtrate diluted with 1 liter of water. The product, 3β,12-diacetoxy-5,7,9(11)-pregnatrien-20-one dimethyl maleate adduct, precipitated and was collected by filtration. The yield was 1.98 grams; its melting point was 202–210 degrees centigrade, but this was raised on recrystallization to 216–218 degrees centigrade. $[\alpha]_D^{25}$+270.42 degrees (chloroform).

*Analysis.*—Calc. for $C_{31}H_{42}O_8$: C, 66.64; H, 7.58; $CH_3CO$, 15.41. Found: C, 66.57; H, 7.25; $CH_3CO$, 15.16.

The same compound was obtained by treating 3β,12-diacetoxy-5,7,9(11)-pregnatrien-20-one maleic anhydride adduct (Example 1) with diazomethane.

PREPARATION 1.—MALEIC ANHYDRIDE ADDUCT OF 3β-ACETOXY-12-HYDROXY-5,7,9(11)-PREGNATRIEN-20-ONE

To a solution of 1.5 grams of the maleic anhydride adduct of 3β-acetoxy-12-bromo-5,7,9(11)-pregnatrien-20-one (melting point, 216–218 degrees centigrade; prepared as described in our copending application Serial No. 184,702) in 150 milliliters of acetone was added 60 milliliters of 0.1 normal silver nitrate solution. The addition was made portionwise with shaking. After one hour at room temperature, the silver bromide which formed was removed by filtration and the filtrate diluted with water until crystallization began. The product, filtered after cooling, was 1.2 grams of 3β-acetoxy-12-hydroxy-5,7,9(11)-pregnatrien-20-one maleic anhydride adduct, melting point 225–234 degrees centigrade. A sample recrystallized for analysis melted at 234–237 degrees centigrade. $[\alpha]_D^{25}$+126.6 degrees (chloroform).

*Analysis.*—Calculated for $C_{27}H_{32}O_7$: C, 69.21; H, 6.89. Found: C, 69.84; H, 7.02.

PREPARATION 2.—DIMETHYL MALEATE ADDUCT OF 3β-ACETOXY-12-HYDROXY-5,7,9(11)-PREGNATRIEN-20-ONE

Similarly, by the method of Preparation 1, the corresponding 12-bromo dimethyl maleate adduct that was used in Example 2 hereinbefore was converted to 3β-acetoxy - 12 - hydroxy - 5,7,9(11)-pregnatrien-20-one dimethyl maleate adduct, melting point 205–214 degrees centigrade. $[\alpha]_D^{25}$+139.6 degrees (chloroform).

*Analysis.*—Calculated for $C_{29}H_{38}O_8$: C, 67.68; H, 7.44. Found: C, 67.70; H, 7.48.

*Example 3.—Maleic anhydride adduct of 3β,12-diacetoxy-5,7,9(11)-pregnatrien-20-one*

A solution of 1.86 grams of the maleic anhydride adduct of 3β-acetoxy-12-hydroxy-5,7,9(11)-pregnatrien-20-one (Preparation 1) in 30 milliliters of pyridine and 30 milliliters of acetic anhydride was heated on the steam bath for 45 minutes, cooled and poured into ice water. The resulting precipitate, which weighed 2.0 grams and had a melting point of 230–235 degrees centigrade, was collected and recrystallized from dilute aqueous acetone. The melting point of the recrystallized maleic anhydride adduct of 3β,12-diacetoxy-5,7,9(11)-pregnatrien-20-one was thereby raised to 248–250 degrees centigrade.

*Other examples*

In a manner similar to that described in Example 3, the dimethyl maleate adduct of 3β-acetoxy-12-hydroxy-5,7,9(11)-pregnatrien-20-one (Preparation 2) can be reacted in pyridine with acetic anhydride, propionic anhydride and the like, to yield the corresponding 12-acyloxy derivatives. The dimethyl maleate adduct of 3β,12-diacetoxy-5,7,9(11)-pregnatrien-20-one has a melting point of 216–218 degrees centigrade.

In a similar manner, maleic anhydride and other adducts of 3β-acyloxy-12-hydroxy-5,7,9(11)-pregnatrien-20-ones can be reacted with benzoyl chloride ($C_6H_5COCl$)

in pyridine to give the corresponding adducts of 3β-acyloxy-12-benzoxy-5,7,9(11)-pregnatrien-20-ones and other acylating agents may be used to produce the corresponding 12-acylated steroid adducts.

The maleic acid and maleic anhydride adducts of 3,12-diacyloxy-5,7,9(11)-pregnatrien-20-ones of this invention are convertible to trienes, namely, 3,12-diacyloxy-5,7,9(11)-pregnatrien-20-ones, having double bonds at the 5(6), 7(8) and 9(11) and the formula:

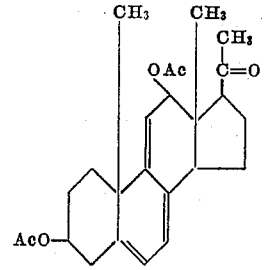

wherein Ac has the significance hereinbefore specified. The removal of the maleic acid or maleic anhydride radical is effected by a pyrolysis reaction which consists essentially in heating the maleic acid or maleic anhydride adduct of the 3,12-diacyloxy-5,7,9(11)-pregnatrien-20-one in the presence of an organic amine at a temperature of approximately 100 to approximately 225 degrees centigrade, with or without the presence of an organic solvent, and thereafter isolating the product triene. It is not necessary to isolate the adducts from a reaction mixture in which the adduct was formed in order to effect the removal of the adduct radical in accordance with such pyrolysis processes, since the entire reaction mixture or crude product may be treated. The desired triene can be obtained in a high degree of purity and in excellent yields.

Amines which can be used in this pyrolysis process include: secondary aliphatic amines such as dimethylamine, diethylamine, dipropylamine, dibutylamine, diamylamine, dioctylamine; tertiary aliphatic amines such as trimethylamine, triamylamine, methyldioctylamine, methyldiethylamine; secondary and tertiary cycloaliphatic amines such as N-methylcyclohexylamine, N,N-dimethylcyclohexylamine, N,N-diethylcyclohexylamine; secondary and tertiary heterocyclic amines such as pyrrolidine, N-methylmorpholine, N-ethylpyrrolidine, morpholine, piperidine, N-methylpiperidine, 2-methylpiperidine, 1,2-dimethylpiperidine, 1,2,4-trimethylpiperidine, 2,4,6-trimethylpiperidine, 1-ethyl-2,4,6-trimethylpiperidine; aromatic heterocyclic amines such as pyridine, picoline, lutidine, collidine, quinoline, quinaldine, lepidine, 3-methylquinoline; secondary and tertiary carbocyclic aromatic amines such as N-methylaniline, N-ethylaniline, N-butylaniline, N-benzylaniline, N,N-dimethylaniline, N,N-diethylaniline, N,N-dibutylaniline, N,N-dibenzylaniline, N-methyltoluidine, N,N-diethyltoluidine, N-ethylxylidine, N,N-dimethylxylidine; substituted aliphatic amines such as diethylaminoethanol, dibutylaminoethanol, N-pyrrolidylethanol, N-piperidylethanol; substituted aromatic amines such as orthomethoxy-N,N-dimethylaniline, para-ethoxy-N,N-diethylaniline, para-chloro-N,N-dimethylaniline, para-bromo-N,N-diethylaniline, para-fluoro-N,N-dibutylaniline, N,N-dimethylmesidine (N,N - dimethyl - 2,4,6 - trimethylaniline); secondary and tertiary aralkyl amines such as methylbenzylamine, dimethylbenzylamine, propylbenzylamine, diisopropylphenethylamine, diethylphenylisopropylamine; and primary amines such as butylamine, hexylamine, octylamine, cyclohexylamine, aniline, toluidine, xylidine and the like.

The process comprises heating the selected 3-acyloxy-12,20-dione maleic acid or maleic anhydride adduct to a temperature between approximately 100 and approximately 225 degrees centigrade, preferably between 175 and 200 degrees centigrade, in the presence of an organic amine, removing excess amine, and recovering the product triene. The time required for the reaction is usually from approximately 1 to approximately 8 hours, depending upon such factors as the particular steroid adduct being treated, the amine employed, and temperature of reaction. Ordinarily, a reaction period of approximately 4 hours is entirely satisfactory, although, at lower temperatures, a more extended period may be employed to advantage. The employment of pressure may in some cases be advantageous, although it is in most cases preferred to conduct the pyrolysis reaction at atmospheric pressure. After completion of the reaction, the pure triene product can be recovered in conventional manner, such as by evaporation of solvent in vacuo, redissolving the residue in an organic solvent, e. g., methanol, diluting with water, extracting with ether, washing the solution until neutral, drying, evaporating to dryness, chromatographing over an alumina column, and recrystallizing from an organic solvent, if desired.

Inasmuch as the foregoing specification comprises preferred embodiments of the invention, it is to be understood that alterations and modifications may be made therein in conventional manner and that the invention is limited solely by the scope of the claims appended hereto.

We claim:

1. An adduct of a 3β,12-diacyloxy-5,7,9(11)-pregnatrien-20-one having the formula:

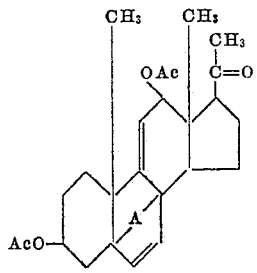

in which Ac is an acyl radical of a hydrocarbon aliphatic carboxylic acid containing from 1 to 8 carbon atoms, inclusive, and A is the adduct radical of an α,β-unsaturated carbonyl compound of the group consisting of maleic acid, maleic anhydride, and dialkyl maleates whose alkyl radicals contain from 1 to 8 carbon atoms, inclusive.

2. A maleic anhydride adduct of a 3β,12-diacyloxy-5,7,9(11)-pregnatrien-20-one, wherein the acyloxy groups are of the formula AcO, Ac being the acyl radical of a hydrocarbon aliphatic carboxylic acid containing up to eight carbon atoms, inclusive.

3. A dialkyl maleate adduct of a 3β,12-diacyloxy-5,7,9(11)-pregnatrien-20-one, wherein the acyloxy groups are of the formula AcO, Ac being the acyl radical of a hydrocarbon aliphatic carboxylic acid containing up to eight carbon atoms, inclusive.

4. The maleic anhydride adduct of 3β,12-diacetoxy-5,7,9(11)-pregnatrien-20-one.

5. The dimethyl maleate adduct of 3β,12-diacetoxy-5,7,9(11)-pregnatrien-20-ones.

No references cited.